(12) United States Patent
Scharf

(10) Patent No.: US 8,497,634 B2
(45) Date of Patent: Jul. 30, 2013

(54) WIRELESS LIGHTING SYSTEM FOR STAIRCASES AND PASSAGEWAYS

(75) Inventor: Joshua Scharf, Short Hills, NJ (US)

(73) Assignee: Innovation Works, Inc., Short Hills, NJ (US)

( * ) Notice: Subject to any disclaimer, the term of this patent is extended or adjusted under 35 U.S.C. 154(b) by 1000 days.

(21) Appl. No.: 12/583,731

(22) Filed: Aug. 25, 2009

(65) Prior Publication Data

US 2010/0060173 A1 Mar. 11, 2010

Related U.S. Application Data

(60) Provisional application No. 61/107,931, filed on Oct. 23, 2008.

(51) Int. Cl.
*H05B 37/02* (2006.01)

(52) U.S. Cl.
USPC ........... 315/149; 315/153; 315/159; 315/360; 362/146

(58) Field of Classification Search
USPC ..... 340/286.01, 309.16, 541, 573.1; 315/134, 315/136, 149, 153, 159, 312, 324, 360; 362/145, 362/146
See application file for complete search history.

(56) References Cited

U.S. PATENT DOCUMENTS

| | | | |
|---|---|---|---|
| 5,258,899 A | 11/1993 | Chen | |
| 5,575,557 A | 11/1996 | Huang | |
| 5,763,872 A | 6/1998 | Ness | |
| 5,818,128 A | 10/1998 | Hoffman | |
| 6,548,967 B1 * | 4/2003 | Dowling et al. | 315/318 |
| 6,685,332 B1 * | 2/2004 | Clark | 362/146 |
| 7,148,628 B2 | 12/2006 | McCavit | |
| 7,633,406 B2 * | 12/2009 | Miki | 340/9.1 |
| 7,741,785 B2 * | 6/2010 | Juen et al. | 315/149 |
| 8,035,320 B2 * | 10/2011 | Sibert | 315/312 |
| 8,083,367 B2 * | 12/2011 | Anderson et al. | 362/147 |
| 2003/0189823 A1 * | 10/2003 | George et al. | 362/84 |
| 2005/0172568 A1 | 8/2005 | Crandall | |
| 2005/0231134 A1 * | 10/2005 | Sid | 315/294 |
| 2007/0229250 A1 | 10/2007 | Recker | |
| 2008/0211427 A1 | 9/2008 | Budde | |
| 2009/0045941 A1 | 2/2009 | Cooper | |

* cited by examiner

Primary Examiner — Thuy Vinh Tran
(74) Attorney, Agent, or Firm — Gearhart Law, LLC

(57) ABSTRACT

The invention discloses an illumination system having a first proximate detector with a first zone detector and a first transmitter. The first zone detector can detect the passing of a human body and the transmitter can send a signal upon such detection. The invention may further include a second zone detector and a second transmitter having similar capacities. In addition, the invention may also have a first staircase illuminator and a second staircase illuminator. Detection of a person passing near a zone detector may cause a staircase illuminator to illuminate a staircase area. The process of transmitting, receiving and illuminating may continue for as long as any of the illuminators within the illumination system that has not yet been illuminated.

21 Claims, 11 Drawing Sheets

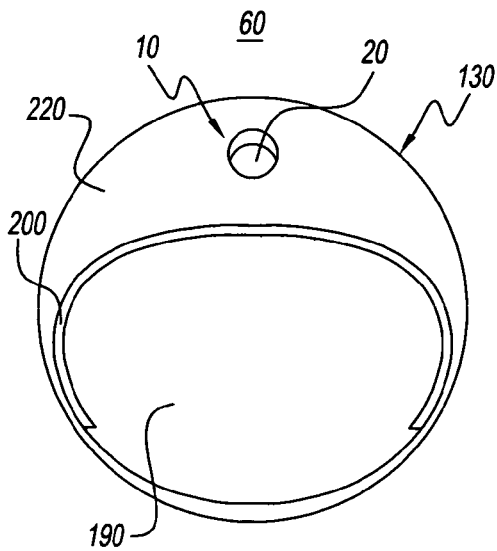
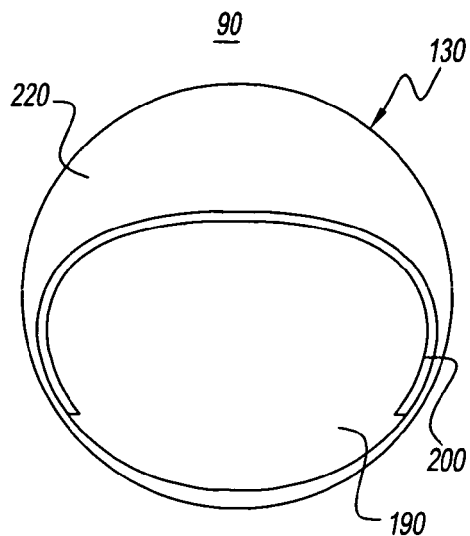
FIG. 1A    FIG. 1B
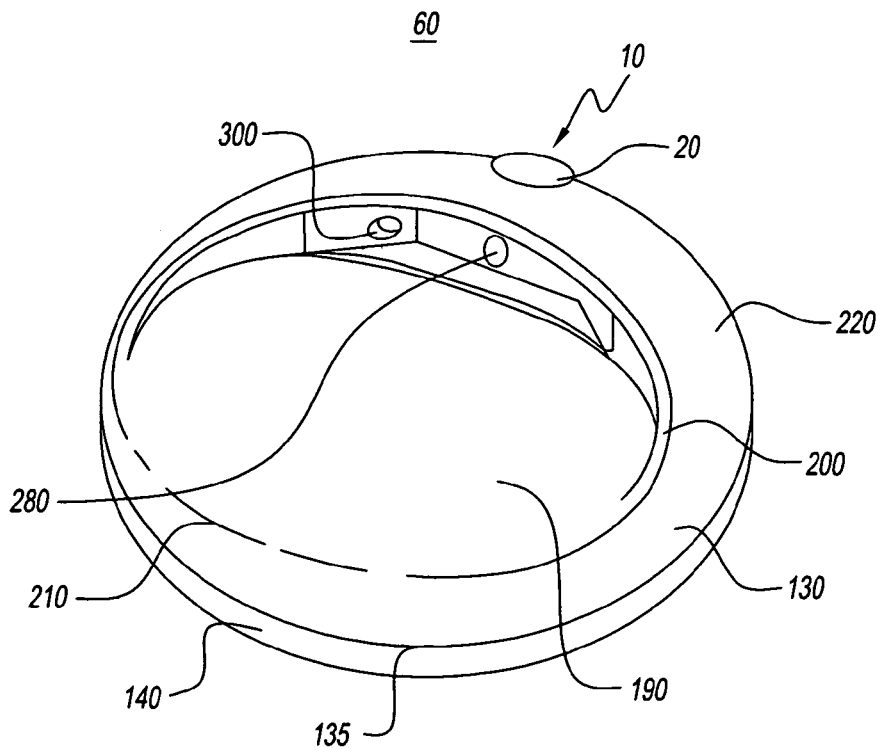
FIG. 2

WIRELESS LIGHTING SYSTEM FOR STAIRCASES AND PASSAGEWAYS

CLAIM OF PRIORITY

This application is claims the benefit of a U.S. Patent Provisional application Ser. No. 61/107,931, filed on Oct. 23, 2008, the contents of which are fully incorporated herein by reference.

FIELD OF THE INVENTION

The invention relates to proximity illumination lighting fixtures, their use and installation.

BACKGROUND OF THE INVENTION

The invention relates to proximity lighting fixtures from here on in known as staircase illuminators or simply illuminators, and to an illumination system having such illuminators that are working separately or in unison. Such fixtures are needed to illuminate usually dark areas quickly and effortlessly. One of the innovative benefits of the present invention is that the system of devices takes a jiffy to install, is a snap to maintain and is activated through sensory awareness of someone or something moving within a zone monitored by its proximity sensors. The invention relies on wireless communications between one or more units to activate the fixtures, drastically simplifying installation and placement of the units.

The utility of the present invention is primarily during low light conditions, to assist one with middle-the-night trips to the restroom, the refrigerator or to a child's nursery, or to a parent's bedroom. To get to these places, one needs to traverse hallways, stairways, closets, cabinets, and any other dark and shadowy crevices of one's abode. Without light, it is easy to incur and injury or cause a house awaking disturbance when bumping or tripping over an unseen obstacle. At the same time, finding a light switch is not always easy, especially if a light switch is located within the same shadowy and dark area that one needs to traverse. Some try to resolve this problem by turning on the light switch that is closest, such as in their bedroom. Then they move to the nearest light switch in the hallway, and keep going in such mode until they reach their destination. There are many disadvantages to this approach, not the least of them is that the method tends to wake those in the vicinity of the light. This method is time consuming and light switches may still be tough to find. Another disadvantage is that once the light is no longer needed, a person will need to spend additional time turning off these devices individually. These disadvantages are most acute when there is a need to get to the desired location quickly.

The problem has been felt for as long as humans lived in dwellings. Recently, a number of possible solutions entered this area of art. However, the prior art devices still suffer from a number of disadvantages that the present invention addresses. The prior art devices tend to need complex installations aimed at enabling them to be powered from the main power line. Some of the existing devices work in concert by being wired in a series rather than by using radio or infrared wireless communication as in the present invention. Additionally, such wiring requires tools, time and skill to install and implement. Also these devices tend to be obtrusive, create too much or too little light, and still require effort and time to disable. Night lights are sometimes used in an attempt to rectify these issues. Nonetheless, even these devices are less desirable than the present invention, since they tend to hog available outlets, and for the same reason also tend to be individual devices, and thus not very effective in seeing a person through all the way to destination.

Another application of the present invention would be in providing an efficient lighting system in a tunnel or a corridor that receives no natural lighting. Often these areas are visited or traversed very sporadically; therefore constant illumination would be unnecessary and wasteful. At the same time, it would be a hassle to require visitors to engage a light switch to turn on the lights, since there is a good chance that they will not find this switch or would be apprehensive in turning something on or off in an unfamiliar place. The present invention would therefore be very effective in such a place, since it would provide an easy way to trigger a lighting system, that can stay lit only as long as necessary, and which will not require user activation and deactivation.

DESCRIPTION OF THE RELATED ART

U.S. Pat. No. 5,763,872 discloses a night light device provides a low level illumination using electro-phosphorescent lighting which is automatically turned on when motion near the device is detected by the device and if the ambient lighting level is low. When the ambient light level is above a specified level so that it is possible to see without artificial light, the device is inactive. A high intensity lighting feature allows the device to be used as a flashlight in emergencies since the device is fastened to a wall in such a way that it is easily and quickly removed. The front face of the device provides a downwardly directed surface for projecting light toward the floor, and sideways directed surfaces for projecting light to each side. Spherical Fresnel lenses enable the device to detect motion over a 180 degree azimuth. The device may have phosphorescent doping within its case structure so as to provide a dim light even when not energized.

U.S. Pat. No. 5,575,557 makes known a motion sensor light apparatus comprises a lighting body, a mounting base for mounting the lighting body to a wall. The lighting body includes a decorative house for receiving a lamp bulb, and a light base extended downwardly from the bottom end of the decorative house as an integral part of the lighting body. The light base has a top rim, a conical base body extending coaxially and downwardly from the top rim and gradually reducing its diameter to define a conical shape, and a flat bottom end extending downwardly from the base body. The base body has an azimuthal aperture and installs therein a lens, a seat, and a motion sensor circuit board mounted on the seat. The seat has an azimuthal seat aperture superimposing to the aperture of the base body. The lens is adhered to the seat and positioned between the seat aperture and the aperture of the base body, and directs infra-red radiation from a human or vehicle object to an infra-red sensor of the motion sensor circuit board. So that the light apparatus can eliminate the conventional extra housing part and incorporate with or without a decorative tail piece. Furthermore, the motion sensor light apparatus can utilize the minimum components to achieve the maximum effects that it simplifies the electric connecting configuration of the motion sensor circuit board and the lamp bulb, it is easy to detach apart for reparation, and it is easier to assemble.

U.S. Pat. No. 5,285,899 discloses a stackable can tray system including a bottom tray loaded with a layer of cans each having a top rim, an upper tray having a plurality of spaced members depending down from a bottom floor surface of the tray, and a layer of cans in the upper tray. With the upper tray in a normal stacked position on the bottom layer of cans, the spaced members engage relative to the top rims of the cans and thereby block substantial movement of the tray and hold it in a secure position. A generally lateral force applied to the upper tray repositions the spaced members such that the upper tray filled with the layer of cans has its spaced members on the top rims of the cans and it can be slidingly pulled on top of the layer of cans in the bottom tray beneath it, and thereby unstacked.

Various implements are known in the art, but fail to address all the problems solved by the invention described herein. One embodiment of this invention is illustrated in the accompanying drawings and will be described in more detail herein below.

SUMMARY OF THE INVENTION

The invention discloses an illumination system having a first proximate detector with a first zone detector, which is capable of detecting the passing of a human body. Also part of the proximate detector is a first transmitter that is capable of sending a signal upon the activation of the first zone detector. The invention also has a first staircase illuminator capable of illuminating a first staircase area. Once the first zone detector is activated, the first transmitter sends a signal to a receiver on at least one second staircase illuminator, which is capable of illuminating a second staircase area. A second zone detector may be included that is capable of detecting the passing of a human body, which also causes a second transmitter to send a signal to a receiver on the first staircase illuminator or any other staircase illuminator that is part of the illumination system. Included also is the second staircase illuminator that is capable of illuminating the second staircase area. Therefore, briefly, when a person passes near the first proximate detector, the first zone detector is activated and a signal is sent from the first transmitter to the receiver, causing the receiver to direct the second staircase illuminator to illuminate the second staircase area, while the first staircase area is being illuminated by the first staircase illuminator. In another embodiment, when a person passes near the second proximate detector, the second zone detector is activated and a signal may be sent from the second transmitter to the receiver on a third staircase illuminator, which triggers an illumination of a third staircase area, or back to the receiver on the first staircase illuminator. The process of transmitting, receiving and illuminating may continue for as long as there are devices within the illumination system that have not yet been illuminated. Therefore, the present invention succeeds in conferring the following, and other not mentioned, desirable and useful benefits and objectives.

It is an object of the present invention to provide an illumination system that is easy and inexpensive to install, implement and use.

It is another object of the present invention to provide a light fixture capable of activating by detecting motion.

Yet another object of the present invention is to provide a light fixture with a light sensor, to prevent superfluous light activation during day time or when areas are otherwise lit up.

Still another object of the present invention is to provide light fixtures capable of being battery operated, but nonetheless be long life and low on maintenance.

Still another object of the present invention is to provide an energy efficient light fixture having a timer mechanism that will turn off the life after a certain period of time has passed.

Yet another object of the present invention is to provide an energy efficient light fixture that is capable of conserving energy by utilizing energy efficient light emitting diodes and strategically contoured reflective surfaces.

Still another object of the present invention is to provide an illumination system that is capable of being scalable.

Still another object of the present invention is to provide a system of light fixtures capable of discretely illuminating a path for a person in an effortless, energy efficient way.

BRIEF DESCRIPTION OF THE DRAWINGS

FIG. 1A is a front view of the preferred embodiment of a staircase illuminator type A device.

FIG. 1B is a front view of the preferred embodiment of a staircase illuminator type B device.

FIG. 2 is a perspective view of the preferred embodiment of a staircase illuminator type A device.

DESCRIPTION OF THE PREFERRED EMBODIMENTS

Figure 3:
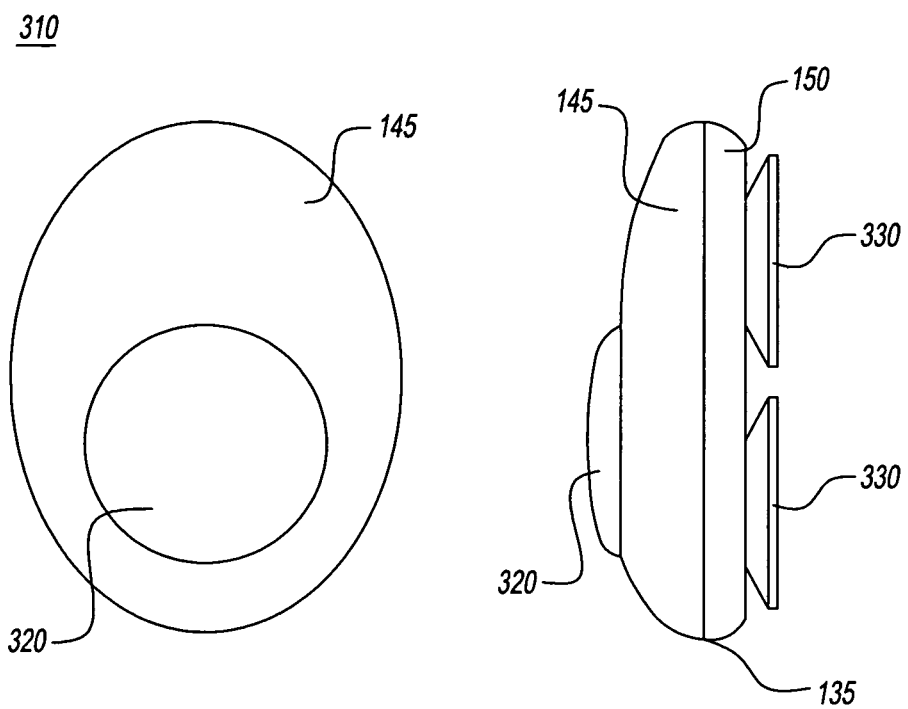
FIG. 3 is a perspective view of the preferred embodiment of an optional remote control device.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

At the outset, it should be noted that a staircase illumination system stated in the claims may refer to a staircase, a hallway, a tunnel, or a corridor, or any other area requiring artificial illumination. It should also be noted that while mentioned as separate components, various components stated in the present invention having similar utility may preferably be embodied within substantially similar physical devices. It is preferable that these components are substantially the same between devices described within the present invention. However, some components may vary between individual devices, or by conditions set by specific requirements of any particular embodiment of the present invention.

Figure 4:
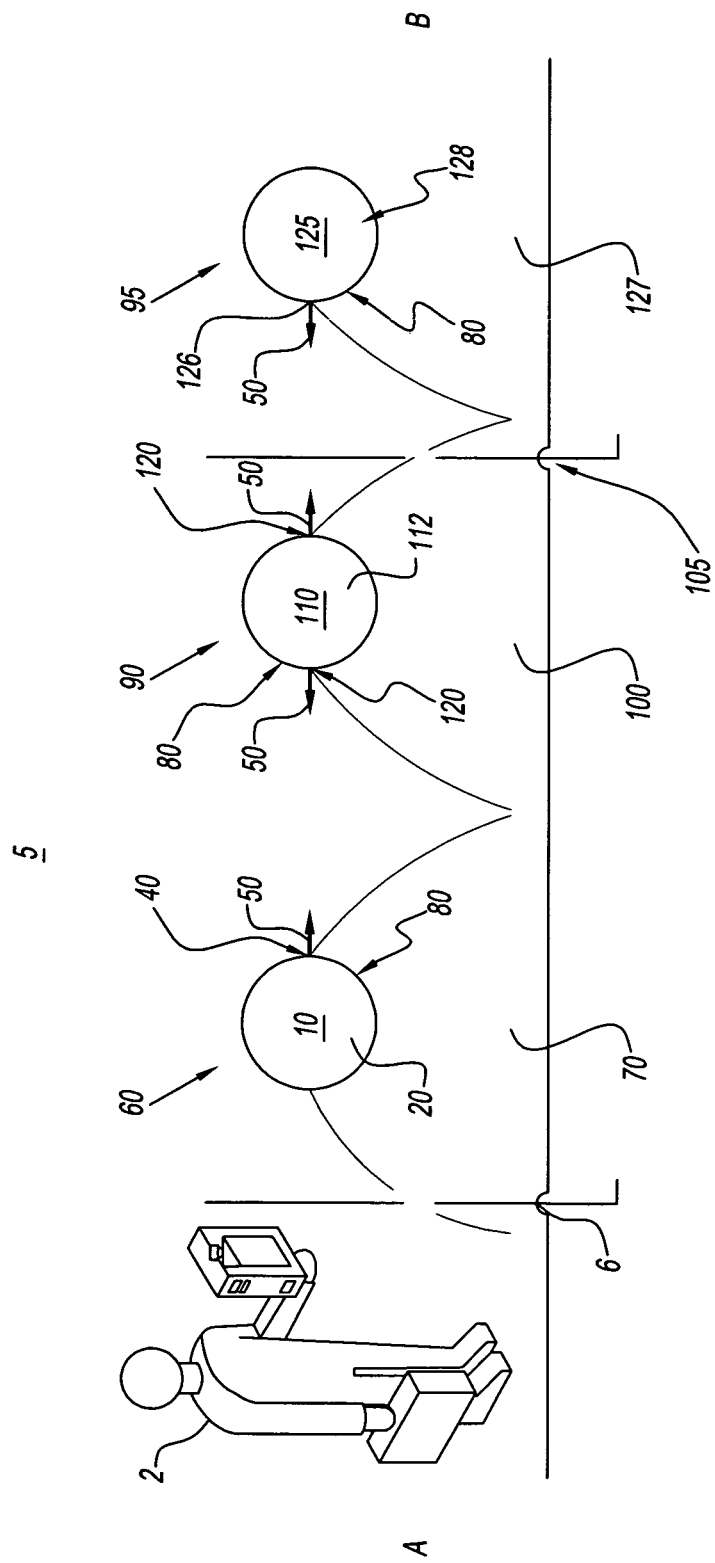
FIG. 4 is a linear overview diagram of the claimed illumination system.

FIGS. 1A and 1B disclose a top view of an A unit and a B unit of the preferred embodiment of the present invention. The A unit may also be referred to as a controlling, primary or a master unit, whereas the B unit may otherwise be known as a secondary, non-primary or a slave unit. The presence of a first proximate detector 10 makes the A unit into a master unit, since proximity sensory mechanism may function as a primary trigger for the illumination of the A device and any other devices included in an illumination system 5 (FIG. 4). Also shown in FIGS. 1A and 1B are a first staircase illuminator 60, a first zone detector 20; and a second staircase illuminator 90, a top section 130, a reflector surface 190, and a rim of reflector surface 200. One skilled in the art would appreciate that what is referred to as the first staircase illuminator 60 may refer to any master or A type device, which may be illuminating any part or section of a staircase. The same may apply to the second staircase illuminator 90, namely, that any B type or slave device may be represented by the drawing in FIG. 1B.

FIG. 2 is perspective view of the illumination component of the present invention that functions as a staircase illuminator device. Shown in this figure are a first proximate detector 10 having a first zone detector 20, a first staircase illuminator 60, a top section 130, a joint 135, a bottom section 140, a reflector area 190, a rim of the reflector area 200, a distal end of the reflector rim 210, a raised area 220, a light source 280, a recess 290, and a light sensor 300. The preferable size of the first zone detector 20 is between ¼ of an inch to ½ inch in diameter. Preferably, the first proximate detector 10 is an infrared sensor. This is also known as Pyroelectric InfraRed sensor or PIR, which essentially works by measuring the difference in the wavelength of infrared radiation emitted objects in its zone of view. The first zone detector 20 may contain a Fresnel lens that is common in the art for these kinds of devices. It should be noted that although only the first staircase illuminator 60 is described by FIG. 2, the same description may apply to other such illuminators, such as, but not limited to a second staircase illuminator 90 and a third staircase illuminator 95, both described in further detail in FIG. 4. FIG. 2 generally describes an A type unit which may determine whether the illumination system 5 should be switched on due to the presence of a transient body, such a human being.

The top section 130 meets the bottom section 140 at the joint 135. This connection may be with a series of snaps that may exist on either the bottom section 140 or the top section 130, with a corresponding snap receiver residing on the opposite section. The joining may additionally be with a thread type surface or with fasteners (not shown) that originates within either of the two sections 130 or 140 and terminate in the opposite section. Any number of fastening means or types may be used, and there is no single preferred way as long as the top and bottom sections 130 and 140 are snugly held together.

Figure 5:
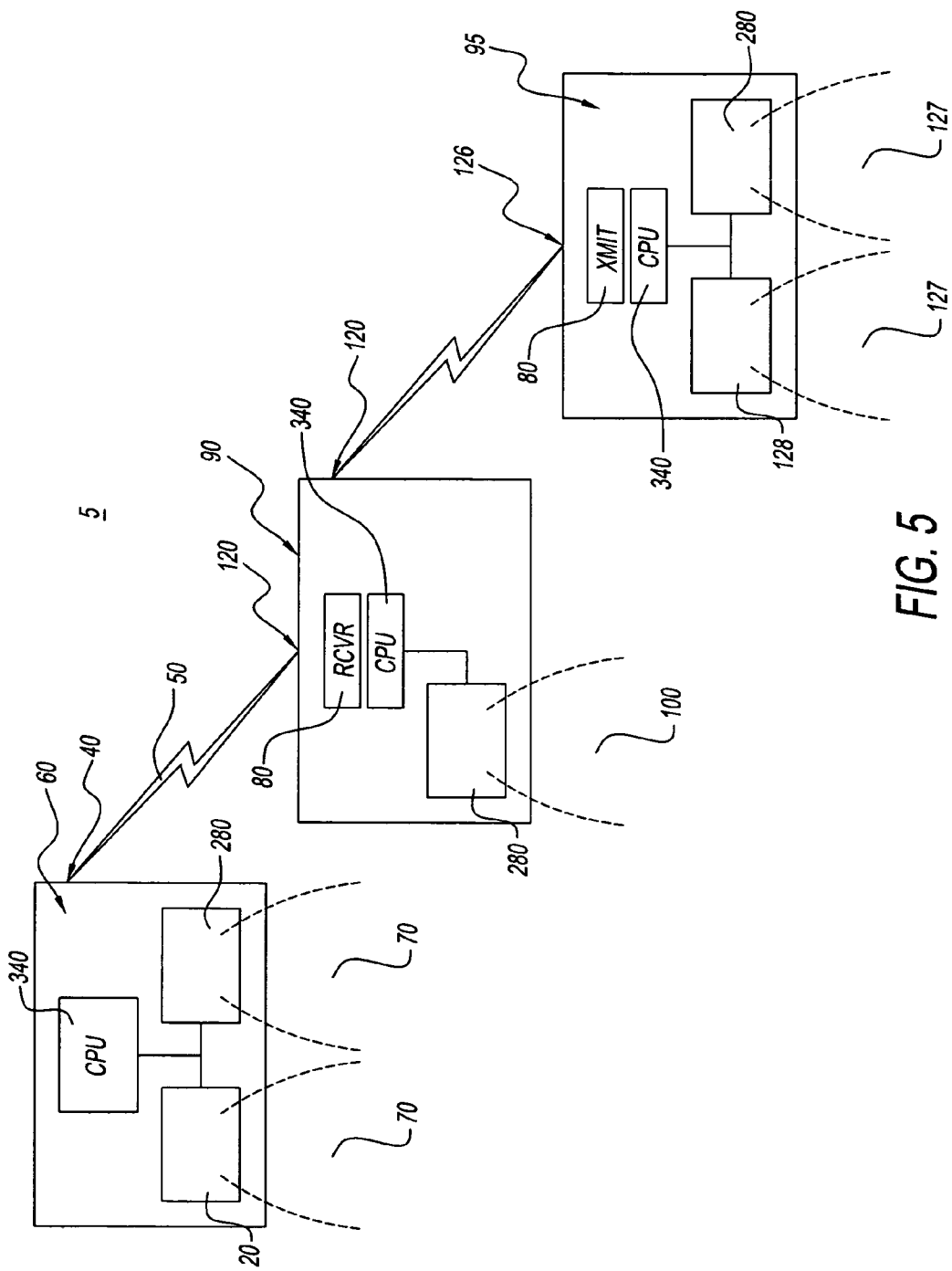
FIG. 5 is a detailed diagram of the master/slave/master embodiment of the present invention.

Another embodiment of the first proximate detector 10 is a photocell. A photocell sensor works by capturing light and converting it into an electronic signal. This type of a sensor is also well known in the art. Other sensor types may be used as well such as, but not limited to ultrasound, or microwave, or a combination of sensors. A combination of sensors may sometimes be desirable due to the possibility of achieving a lower energy consumption by a motion detector, such as the first zone detector 20 or a second zone detector 110 (FIG. 5). A combination works by utilizing a first sensor with the most energy efficient technology to activate a more accurate, but less energy efficient second sensor, as soon as the first sensor is tripped. The first zone detector 20 or a second zone detector 110 or any other zone detector described or extrapolated from the description included herein, may additionally be tuned to ignore motions by animals of various sizes.

Shown in FIG. 2 is the first staircase illuminator 60, but as mentioned earlier, this figure can essentially represent both the second staircase illuminator 90 or the third staircase illuminator 95, or any other illuminator devices included in an embodiment of the present invention. The first staircase illuminator 60 is preferably white, but may be any other color that may be able to better blend in with the surrounding background. The size of the first staircase illuminator 60 is between two and four inches in diameter for an elliptical embodiment, as shown. In an embodiment where the first staircase illuminator 60 is square, cubic or tetrahedral, a device should preferably be between a quarter of an inch to one and a half inches in thickness, 3 to 6 inches in height and 2 to 5 inches in length.

Still referring to FIG. 2, the first staircase illuminator 60 is essentially a shell containing electrical components necessary to enable the present invention, which will be described in further detail in subsequent drawings. The top section 130 contains the reflector area 190, which marks the part of the top section that may be substantially convex or partially recessed to form a reflector area 190. Preferably, no special reflective surface is required for the reflector area 190; rather the reflection is accomplished with contours of the reflector area 190 and the rim of the reflector area 200. This is especially true, if the first staircase illuminator 60 sports the preferred white coloration, or an otherwise highly reflective color. In an embodiment having darker, light absorbing colors, a separate light reflector surface may be included for the reflector area 190. To further assist in light dissipation, the distal end of the reflector rim 210 may be curved in an outward direction, so that light rays that hit the rim 200 in that spot are deflected outwards and perpendicular to the plain of the reflector area 190, or in a more acute or obtuse angles with respect to the plain of the reflector area 190.

Still referring to FIG. 2, in the preferred embodiment of the first staircase illuminator 60, the raised area 220 overlaps with the reflector area 190 and forms a recess 290, which may be used as a location for a light source 280 and a light sensor 300. Alternatively the light source 280 may be disposed in the middle or anywhere else throughout the reflector area 190. Note that the reflector area 190 and the raised area 220 are not strictly necessary for the enablement of the present invention, and may be omitted altogether. However, it may be preferable to place the light sensor 300 within the recess 290, since this is a darkest place within this particular embodiment and there is less of a chance of a sensor being activated by a distant light source. During day light, or when another source of light illuminates the same are as covered by the present invention, the light sensor 300 prevents the present invention from activating to avoid creating wasteful and superfluous source of light. The light sensor technology has been around for a while and is generally well known in the art.

Still referring to FIG. 2, the preferred light source 280 is a light emitting diode. Although there may be no preferred wavelength, brightness, or color remittance for the disclosed light source 280, it would preferably be less powerful than a standard incandescent or florescent lighting, if intended for a household application, and more powerful for a commercial or industrial application. However, this preference should not serve as a benchmark and a light source of any power, or an incandescent or a florescent bulb may also be used for a light source 280.

The bottom section 140 of the first staircase illuminator 60 may be affixed directly to a wall or a supporting surface, with fasteners that may enter from the inside and through the bottom section 140, to terminate within a supporting surface. Alternatively, the bottom section 140 may be affixed to a wall with an adhesive strip that may be disposed on the back surface (not shown) of the bottom section 140. In yet another alternative, a mount bracket may be provided (not shown), which would first be mounted onto a supporting surface, or a wall with an adhesive surface or with fasteners. It would then accept and hold the bottom section 140 by utilizing a threaded mechanism, or an insert-and-turn-to-snap mechanism, or a simple snap mechanism, or any other coupling technique that is well known in the art. The power source 119 (FIG. 7), which may preferably be a battery, or several interconnected batteries, or a wire originating in the central power line, may be accessed by prying open, or twisting open, or unfastening the top section 130 and the bottom section 140 at the joint 130. Alternatively, a separate battery or power bay with or without a cover may be provided (not shown).

FIG. 3 shows an embodiment of a remote control 310 having an actuator button 320 and suction cups 330. Also shown in FIG. 3 are a joint 135, a remote bottom section 145, and a remote top section 150. The remote bottom section 145 and the remote top section 150 conceal a hollow space inside that contains various electronic components that will be described below. Preferably the two sections 145 and 150 will snap together, or be fitted together with fasteners (not shown) at the joint 135. The unit may also be monolithic, having only one section. To change a power source, which in this case are preferably batteries; one would pry open or twist open the device at the joint 135, or open a separate battery pack bay (not shown).

The suction cups 330 afford an ability to retain the remote on an upright wall, or on a narrow surface of a ledge or a molding, or on any other flat surface, so that the remote control 310 may function as a light switch, without the need for a messy and complex installation, ordinarily required by an ordinary light switch. The suction cups 330 are not required for the enablement of the present invention, but are preferred, to keep the remote control 310 from getting misplaced or lost. The remote control 310 communicates with receivers 80 via a wireless technology that is well known in the art, such as, but not limited to radio frequency (RF), ultrasound, Bluetooth or any other wireless technology used in the art. Additionally the remote control 310 may contain an internal light that may be activated when the actuator button is depressed. Another embodiment of a remote may include a light sensor, which would keep the remote control 310 illuminated in the dark, to assist with easy location of the device. The present invention may also include electronic components that would be compatible with a universal remote technology. In such embodiment, the receivers 80 may also be conforming to a universal remote standard. The dimensions of the remote control 310 may preferably be between three and five inches in length, one and a half to three inches in width, and a half of an inch to an inch and a half in thickness. However, any dimension may be selected based on the desired functionality or aesthetic preference.

Still referring to FIGS. 1-3, the outer sections of the devices may preferably be made of plastic, but may also be made of any other hard polymer, or a resin, or a polyresin. A metallic alloy may be used; however, special care would need to be taken to avoid interfering or blocking the wireless communication that is being exchanged by devices within the present invention.

FIG. 4 discloses a linear overview diagram of the claimed illumination system. The illumination system 5 may be implemented in multiple ways. Several applications are disclosed below based on FIG. 4. To ease comprehension, a device having a zone detector, like a first zone detector 20, is considered to be a master, since it may direct devices to illuminate in the presence of a human body, or even an animal body. A device only having a staircase illuminator, such as the second staircase illuminator 90 is considered a slave, since it gets a command from the zone director on a master device to illuminate its section of the staircase. The following stick diagram is a brief description of the various possible embodiments.

a) Master-Slave,
b) Master-Master,
c) Master-Slave-Slave,
d) Master-Slave-Master,
e) Master-Slave-Slave-Master,
f) Master-Master-Master, One skilled in the art will appreciate that many other combinations are possible. The following is a more detailed explanation of the above summary. Enablement of other permutations may be extrapolated from the detailed discussion of the preferred combinations of the devices making up the present invention.

In one embodiment the first proximate detector 10 contains the first zone detector 20 and also uses the first illuminator 60 to light up the first staircase area 70. Simultaneously, the first zone detector 20 signals to the second staircase illuminator 90 and a third illuminator 95 and any illuminators beyond these (not shown), to illuminate their respective staircase areas. The user 2 uses the present invention to illuminate his or her entire path between points A and points B by triggering the first proximate detector 10. However, if the user is moving from point B to point A, the present invention will not be illuminated until the user 2 reaches the first staircase area 70.

In another embodiment a first proximate detector 10 operates the first illuminator 60, while a second proximate detector 110 operates a second illuminator 90 or a last illuminator in a series of illuminators with no other proximate detector in between. Therefore, the user 2 moving from point A to point B will illuminate the entire path between points A and B by triggering the first zone detector 20, which then causes all illuminators to light up by sending a signal 50 from the first transmitter 40. Similarly, when the user 2 is moving from point B to point A, the second zone detector 112, which is on the second proximate detector 110, illuminates the entire staircase area from point B to point A by illuminating the second staircase area 100, and by sending a signal throughout the illumination system 5. The A and B units can be separated by any distance but are likely to be placed up to 20 feet apart.

In yet another embodiment, each staircase illuminator, in this case the first 60, second 90 and third 95 may have its own zone detector. In this embodiment, if additional illuminators are present, they too may have a zone detector of their own. Each individual illuminator does not get triggered until the presence of the user 2 is detected by its respective zone detector. A signal 50 may also be sent by a transmitter on the activated illuminator to the next illuminator in line, or to the entire system 5.

In any embodiment a staircase illuminator system, is not limited to a staircase, but includes any other enclosed area, such as hallway, closet, tunnel or an alley. The illuminator devices may be disposed in line along a horizontal axis or in an up-down formation along a vertical axis. The devices may also be situated diagonally or in a cluster. When a wall is used for structural support, it may preferable to install the present invention twelve to fourteen inches above the ground, a floor or a step.

Still referring to FIG. 4, a greater detail of several embodiments will now be presented. A user 2 is shown about to activate an illumination system 5, by stepping into a first detection point 6, where a first proximate detector 10 may utilize a first zone detector 20 to detect the user 2 with infrared, photocell or another form of proximity detection technology, causing a first staircase illuminator 60 to illuminate a first staircase area 70. Simultaneously, a first transmitter 40 sends a signal 50 to a receiver 80 on a second staircase illuminator 90 to illuminate a second staircase area 100.

At this point the present invention may be presented by several different embodiments. In one embodiment the second illuminator 90 is a slave device to the first proximate detector 10. As such, it contains a receiver 80 that is capable of receiving and demodulating wireless signals 50 from the first transmitter 40, which causes the second illuminator 90 to turn on its light source 280 (FIG. 2) thus illuminating the second staircase area 100. The same signal 50 would be received by a receiver 80 on a third staircase illuminator 95 and illuminate a third staircase area 127. In this embodiment the third staircase illuminator 95 may also function as a master having a third proximate detector 125 with a third zone detector 128. Note that when only two master illuminators are present, either the second proximate detector 110 or the third proximate detector 125 may function as the last proximate detector at point B. When the user 2 moves from point B to point A the third zone detector 128 causes the illumination of the third staircase area 127, and simultaneously transmits a signal 50 from the third transmitter 126, to receivers 80 on the second and first staircase illuminators 90 and 60. One can also appreciate that the third staircase illuminator 95 may function as another slave device with no detection capability as illustrated by the stick diagram (c) above. Getting back to the user 2 who is moving from point A to point B, the third proximate detector 125 may activated when a user 2 reaches a second detection point 105. Alternatively, the third staircase illuminator 95 is activated by a receiver 80 that receives a signal 50 from either the first proximate detector 10 or from the second proximate detector 110, using the second transmitter 120, which may send signals 50 to either receivers on either the first illuminator 60 or the third illuminator 95 or any other illuminator within the illumination system 5.

Still referring to FIG. 4, in another embodiment, all staircase illuminators contain proximity detecting capability. Such that the first proximate detector 10 utilizes the first zone detector 20 to detect a human body of the user 2 who is standing within the first detection point 6. The first proximate detector 10 causes the first staircase illuminator 60 to illuminate the first staircase area 70. At the same time, the first transmitter 40 sends out a signal 50 to the receiver 80 on the second illuminator 90. This signal 50 may either activate the second zone detector 112 or illuminate the second staircase area 100 with the second illuminator 90. If the signal 50 serves to activate the second zone detector 112, as in the first alternative, then the second illuminator 90 may illuminate the second staircase 100 when user 2 is detected by the activated second zone detector 112.

Still referring to FIG. 4, when the user 2 reaches the second detection point 105, the third proximate detector 125 causes the third staircase illuminator 95 to light up the third staircase area 127. At the same time a signal 50 may be generated by a third transmitter 126 and received by receiver 80 on the second staircase illuminator 90, or on the first staircase illuminator 60, or by any staircase illuminator disposed further down the path of the user 2, beyond point B. The third zone detector 127 may be additionally used as a turn off switch for the illumination system 5. As an example, this can be accomplished by first notifying the receiver 80 on the third staircase illuminator 95 that the user 2 has entered the area monitored by the illumination system 5. Such notification may come from detection by the first or the second zone detectors 20 or 112 respectively, which would be sent to the third or last illuminator device 95 via the signal 50. Once the user 2 traverses and exits the third staircase area 127, the third (or last) proximate detector 125 would send a signal from the third transmitter 126 to all receivers 80, signaling to turn off illumination.

FIG. 5 is a detailed diagram of the master/slave/master embodiment of the present invention. Shown in this figure is an illumination system 5, a first staircase illuminator 60 having a first zone detector 20, a first transmitter 40, a signal 50, a first staircase area 70, a receiver 80, a printed circuit board (PCB) 340, and a light source 280. Also shown is a second staircase illuminator 90, having a PCB 340, a receiver 80, a light source 280 and a second staircase area 100. One can see that the second illuminator 90 is a slave device since the second proximate detector 110 is not provided. Instead, illumination is activated by the signal 50 that is registered by the receiver 80 from either the first staircase illuminator 60 or the third staircase illuminator 95. Also shown in FIG. 5 is a third staircase illuminator 95, having a third zone detector 128, a third transmitter 126, a third staircase area 127, a light source 280, and a PCB 340. The PCB 340 provides the circuitry and intelligence to enable the present invention.

Additionally, the PCB 340 would provide the timing functionality (not shown) that would limit the time that the light source 280 stays lit. The preferred duration of light after activation is between 10 seconds and 10 minutes. However, any duration may be feasible, limited by preference, life of the device, or by the duration of the power source. A separate physical adjustment means, such as a knob, may be additionally provided to adjust the duration of the light. In should also be noted that the signal 50 is not disclosed as moving in any particular direction since the preferred embodiment proposes a bi-directional method of communication, where each device may transmit and receive the signal 50. The slave device may nonetheless still contain a transmitter module, so that it may be able to amplify and further transmit the signals received by its receiver 80.

Figure 6:
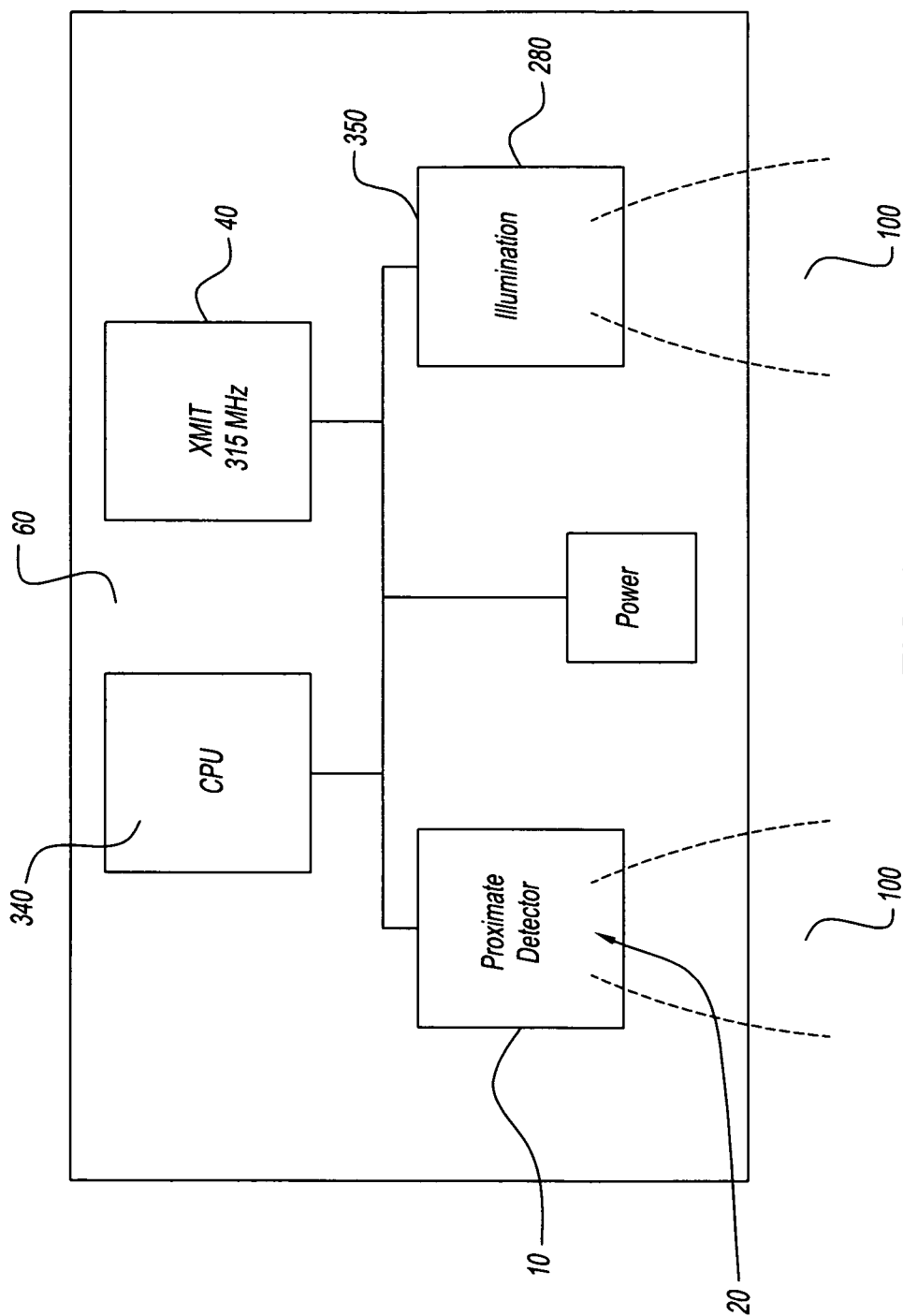
FIG. 6 is a detailed diagram of a staircase illuminator.

FIG. 6 is a detailed diagram of the first staircase illuminator 60, having a PCB 340, a first transmitter 40, a first proximate detector 10 that is utilizing a first zone detector 20 to identify motion within the first staircase area 100. Also shown is a power source 119 and a light source 280. An internal bus 350 connects all of the components into a common circuit. One skilled in the art would appreciate that the first staircase area need not have to be the same for both the first zone detector 20 and the light source 280. The first zone detector 20 may cover a wider area than the light source 280. Additionally the angle of the first zone detector 20, or any detector included with the present invention may cover an area beyond the illuminated staircase area. This may be desired so that the area gets lit up immediately before the user 2 has entered it. It should be noted that the first transmitter 40 preferably emits signals 50 at frequencies between 300 and 500 Megahertz. Although only the first transmitter 40 is being described in this figure, the same set of preferences applies to other transmitters within the scope of the present invention.

Figure 7:
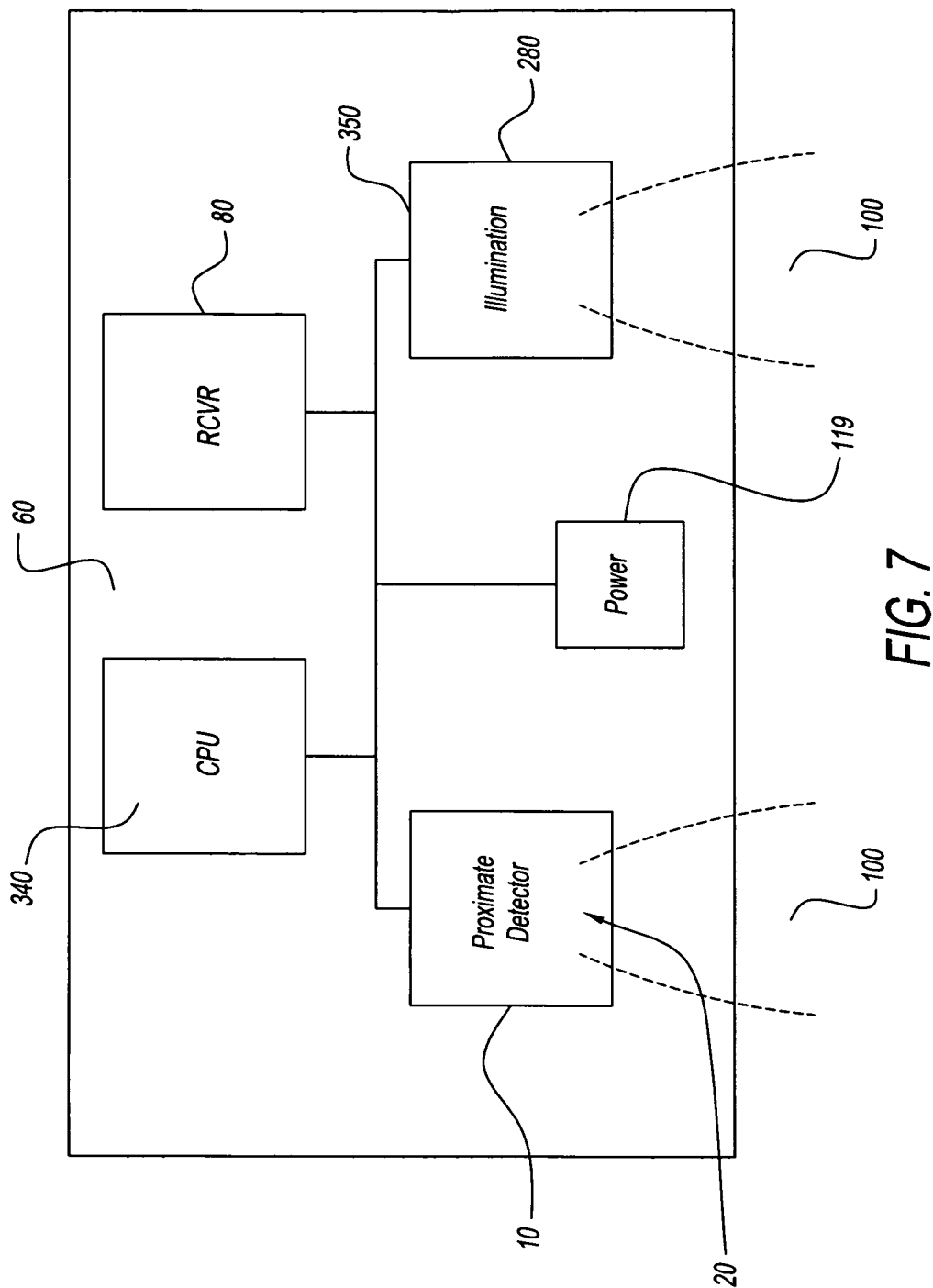
FIG. 7 is another detailed diagram of an embodiment of a staircase illuminator.

FIG. 7 is another detailed representation of the present invention. Shown is a PCB 340, a receiver 80, a first staircase illuminator 60, a first proximate detector 10 with a first zone detector 20. Also shown are the power source 119, an internal bus 350, and a light source 280. FIG. 7 includes a receiver 80 without the first transmitter 40. FIG. 7 may also be used to represent a slave device that is not able to send a signal 50 to other illuminators within the illuminated system 5 due to the lack of a proximate zone detector, such as a first zone detector 20. The preferred power source 119 for the present invention is a battery producing 4.5-5 Volts. However, higher or lower battery power may be required depending on the size and constituency of a particular embodiment. For example, a master device having a detector and a transmitter may likely generate a greater amount of resistance, and therefore consume more electrical energy, than a slave device with only a receiver 80 and a light source 280.

Figure 8:
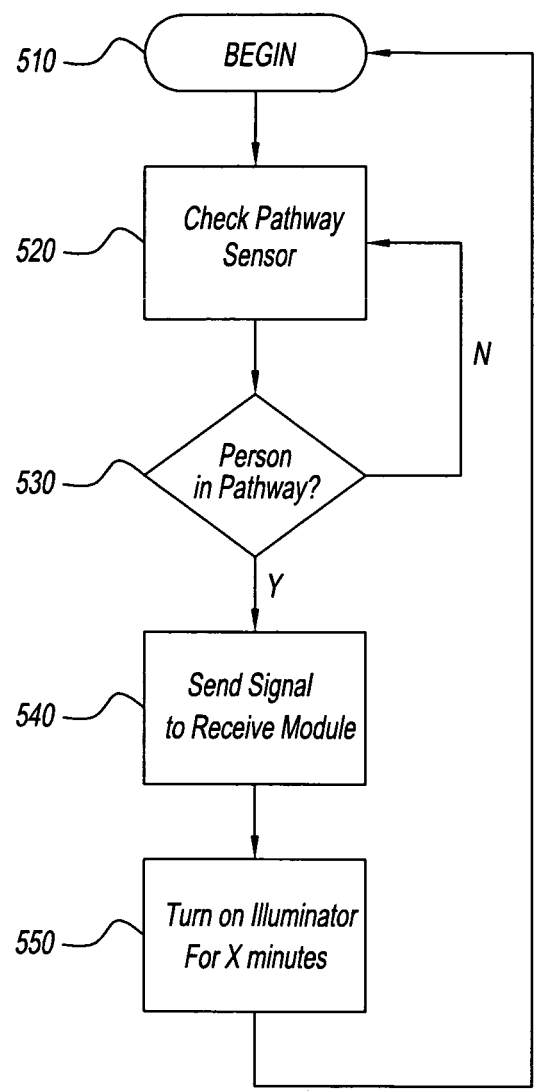
FIG. 8 is a flowchart of a general operation of a transmit module.

FIG. 8 shows a flowchart of the general operation of the transmit module. The transmit module monitors the staircase 520 to determine if a person, such as a user 2 (FIG. 4), has crossed a monitored area 530, such as a staircase, a hallway, or some other area. When the presence of a person is detected, step 540 is carried out and a signal 50 (FIG. 4) is sent out to the receive module 80. This is followed by a signal 50 which turns on an illumination system (e.g., LED) in step 550 for a period of time, such as 5 minutes.

Figure 9:
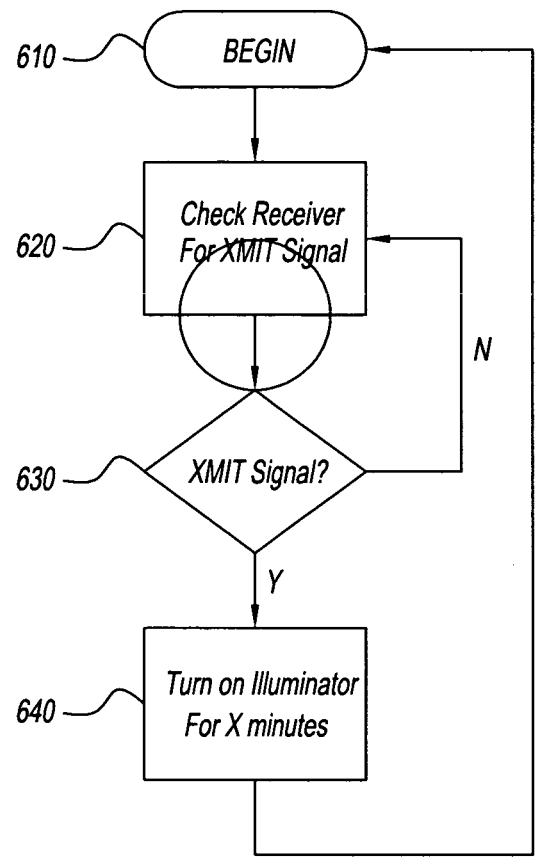
FIG. 9 is a flowchart of a general operation of a receiver module.

FIG. 9 shows a flowchart of the operation of the receive module 80. The receive module waits for a signal from the transmit module in step 620, if there is a transmit signal 630 then the illuminator is turned on for a period of time, such as 5 minutes, step 640.

Figure 10:
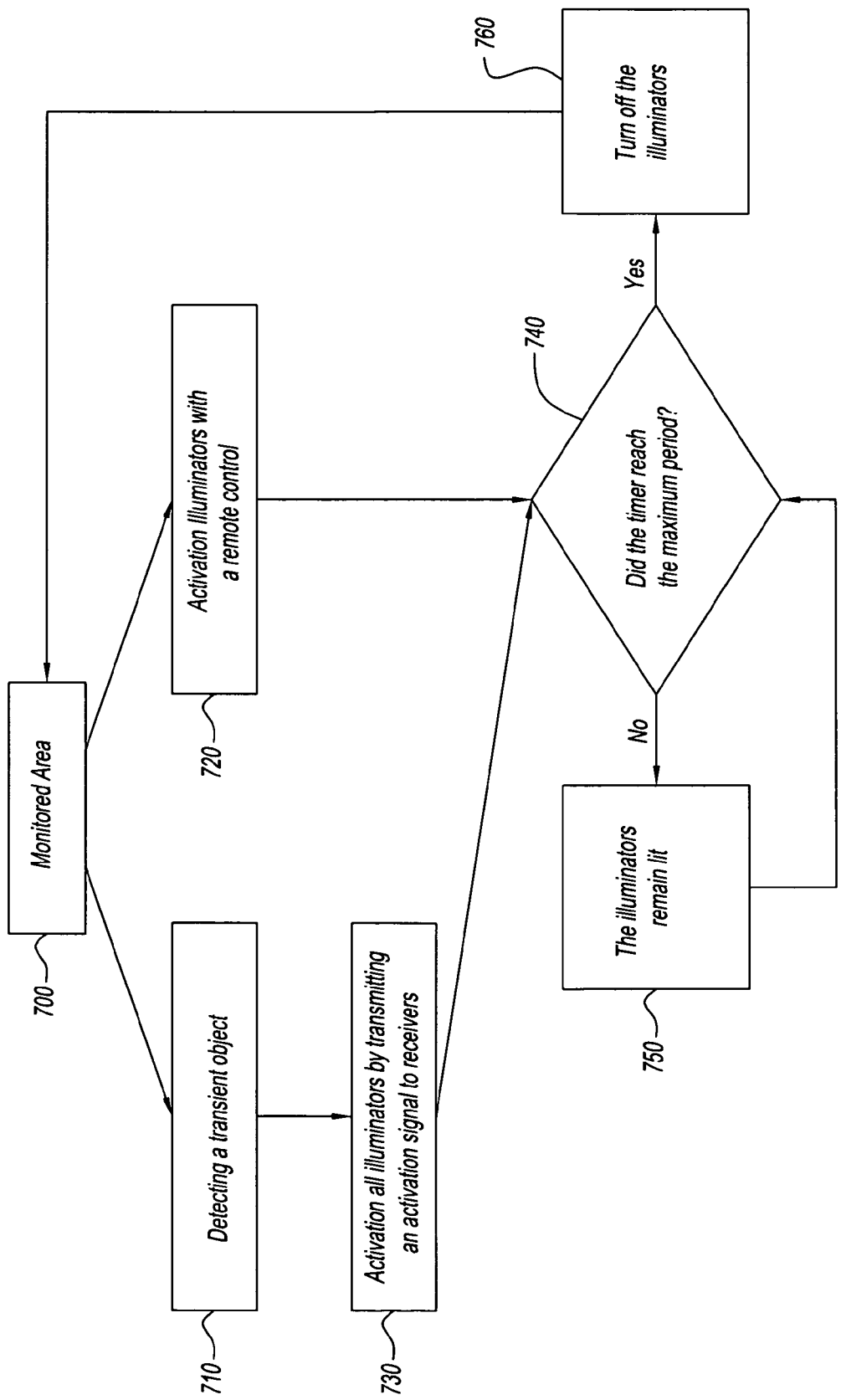
FIGS. 10, 10A, and 10B represents alternative implementations of the present invention.

FIG. 10 is a diagram of a method of using the present invention. The starting step 700 is an area that is being monitored for movement by a transient objects, such as a person or an animal. Referring back to FIG. 4, the area may be monitored at point A only, or at point B only, or at both points A and B, and perhaps also between points A and B. Once a transient object is detected at step 710, the illumination system is activated by sending a signal 50 from the first transmitter 40, or from any other transmitter so activated, to receivers 80 on the other staircase illuminators. The signal 50 causes the illumination system 5 to light up in step 730. Alternatively, in step 720, the illumination system may be activated manually with a remote control 310 (FIG. 3), which sends a signal 50 using its internal remote control transmitter (not shown) to receivers 80 on the staircase illuminators, causing the light sources 280 to illuminate. The remote control transmitter uses a compatible or the same wireless technology and transmission protocol to communicate with the other devices within the present invention.

Preferably, the PCB 340 on each staircase illuminator includes a physical circuitry to enable a timer module, which would determine, in step 740, if the maximum desired time for the present invention to stay lit, has been reached. In step 760, if the maximum desired or preset on-time has been reached, the illuminators go off, and the system is reverted back to step 700. Otherwise, in step 750 the illuminators stay on until the timer reaches the maximum time in step 740, or until a command is send to turn off the illuminators, which may be sent from a remote control transmitter (not shown) on the remote control 310. If this occurs, the illuminators would be turned off in step 760, and the illumination system 5 would be reset back to step 700.

It should be noted that if a transient object, such as a user or an animal, remains active and moving within the monitored area, the illuminators will stay lit, and the timer will be reset each time a first second or third zone detector 20,110 or 128 or any other zone detector perceives the presence of a person or an animal. The detection may be tuned to occur by a mere presence of a person or animal, even if they are not moving. The illumination system 5 may be referred to as a contiguous lighting system, since the staircase illuminators act in unison by sending signals 50 to each other. Contiguous system may mean a line up or a cluster of interconnected devices. Removing or disabling one of the devices in a contiguous illumination system may disrupt other devices unless a different outcome is desired.

The figures present a battery powered embodiment of the present invention. A slightly different schematic would be used of an AC powered embodiment, for example the positioning and type of capacitors may be different in an embodiment that is powered by a main power line.

In a preferred embodiment, a transmission frequency of 315 Mhz is used, but, other frequencies may also be utilized to wirelessly interface the transmitter and the receiver.

Figure 10A:
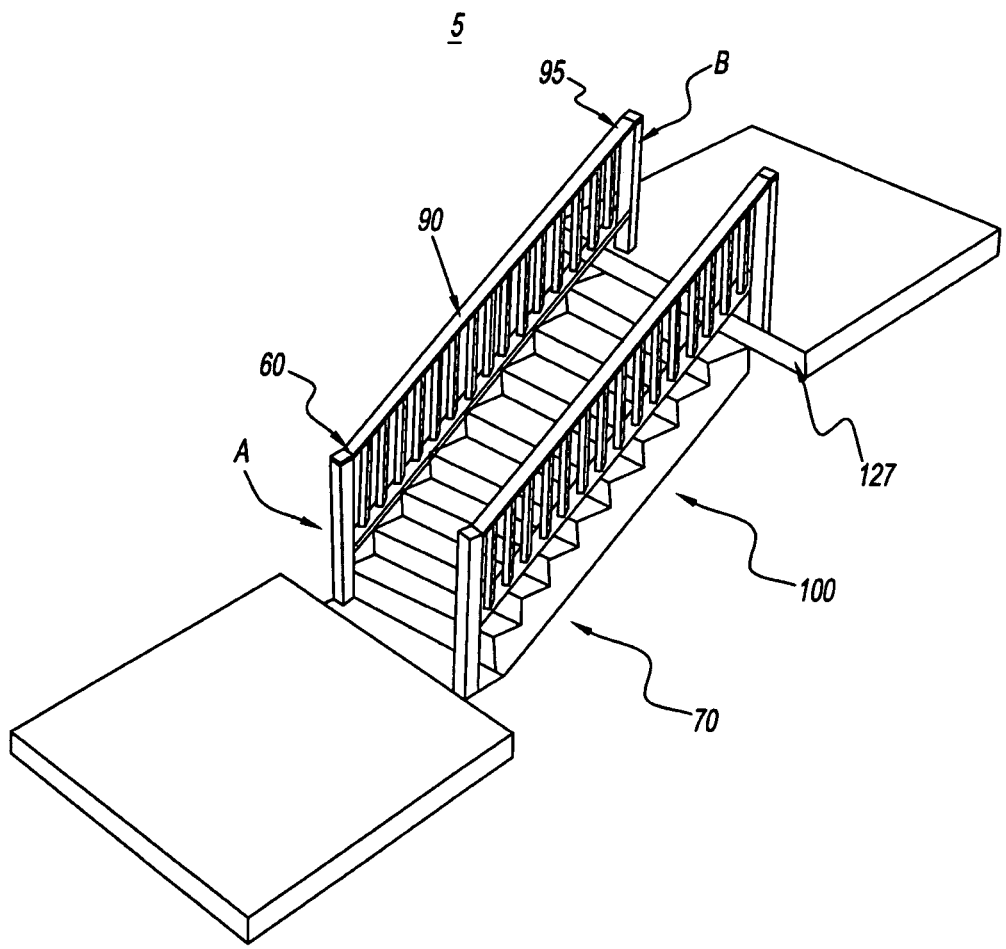
Figure 10B:
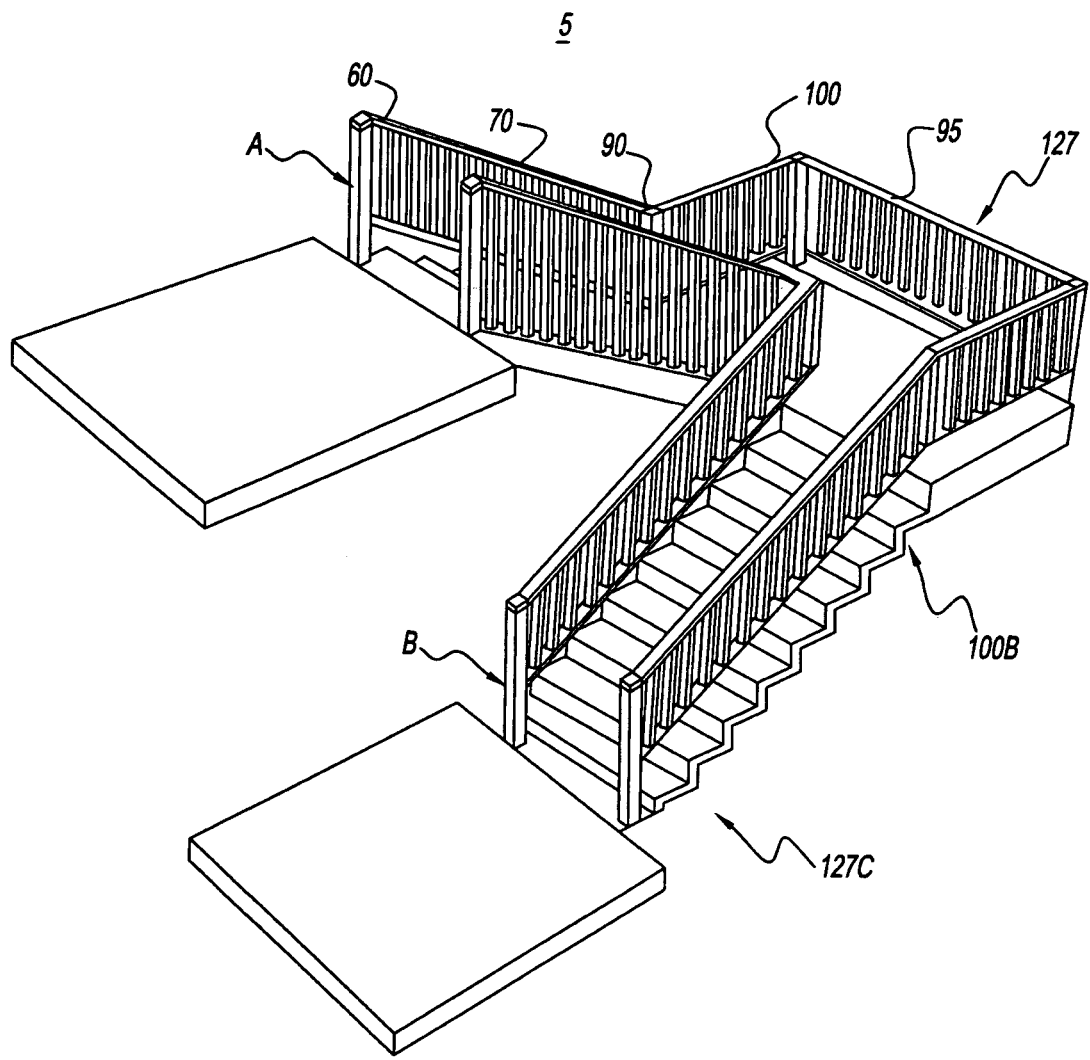

FIGS. 10A and 10B represent the preferred embodiment of the present invention where master units and slave units are aligned in a string formation, with the master unit beginning and ending the formation and with at least one slave unit being in the middle. The master unit, also referred to as an "A" unit or a first staircase illuminator 60 or a third staircase illuminator 95, trigger the "B" units, also referred to as secondary or slave devices or a second staircase illuminator 90. In an embodiment having a string of more than three illumination devices, the thirst staircase illuminator 95 becomes the last staircase illuminator in a string. In the preferred embodiment, the first staircase illuminator 60 and the third or last staircase illuminator 95 are equivalent devices, representing a master or an "A" type of a device.

FIG. 10A is one implementation of the illumination system 5 showing points A and B; a first staircase illuminator 60, illuminating a first staircase area 70; a second staircase illuminator 90, illuminating the second staircase area 100; and a third staircase illuminator 95, illuminating the third staircase area 127. Note that the illuminators may be disposed in the reverse order, or in a cluster or in any other fashion. The selection of points A and B was also arbitrary. In this embodiment, the devices are installed in a master-slave-master configuration, which may also be varied to include other configurations discussed above.

FIG. 10B is another implementation of the illumination system 5 showing a more complex multilevel system to accommodate a multi-floor system installation. Shown are points A and B, a first staircase illuminator 60, a second staircase illuminator 90, a third staircase illuminator 95, a fourth staircase illuminator 90B, a fifth staircase illuminator 95B; illuminating respectively a first staircase area 70, a second staircase area 90, a third staircase area 127, a fourth staircase area 100B, and a fifth staircase area 127C. In this embodiment, the devices are arranged in a master-slave-master-slave-master configuration, although any other configuration is also feasible. This figure shows that the present invention is extremely scalable due to interconnectivity that utilizes wireless technology and because illuminators can be easily added or subtracted within an existing illumination system 5.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A staircase illumination system comprising:
   a first proximate detector, the proximate detector having:
   a first zone detector, the first zone detector detecting the passing of a human body;
   a first transmitter, the first transmitter sending a signal upon the activation of the first zone detector;
   a first staircase illuminator, the first staircase illuminator illuminating a first staircase area;
   a receiver, the receiver having
   a second staircase illuminator; the second staircase illuminator illuminating a second staircase area;
   a second zone detector, the second zone detector detecting the passing of the human body; and
   a second transmitter, the second transmitter sending a signal upon the activation of the second zone detector;
   so that when a human body passes near the first proximate detector, the first zone detector is activated and the signal is sent from the first transmitter to the receiver, and the receiver illuminates the second staircase area; and wherein the first staircase illuminator illuminates the first staircase area;

and so that when a human body passes near the second proximate detector, the second zone detector is activated and the signal is sent from the second transmitter to a receiver on a third staircase illuminator illuminating a third staircase area;

or the signal is sent from the second transmitter back to the receiver on the first staircase illuminator illuminating the first staircase area.

2. The staircase illumination system as in claim 1 wherein the first proximate detector is an infrared sensor.

3. The staircase illumination system as in claim 1 wherein the first proximate detector is a photocell.

4. The staircase illumination system as in claim 1 wherein the first zone detector is activated from 0 to 10 minutes.

5. The staircase illumination system as in claim 1 wherein the first zone detector is activated from 0 to 1 minute.

6. The staircase illumination system as in claim 1 wherein the first transmitter transmits on a frequency of approximately 315 Mhz.

7. The staircase illumination system as in claim 1 wherein the first transmitter transmits on a frequency in the range of 400 to 500 Mhz.

8. An illumination system comprising:
a first proximate detector, the first proximate detector having a first illuminator;
a first transmitter, the first transmitter sending a signal upon the activation of the first proximate detector;
at least a second illuminator having a receiver receiving the signal from the first transmitter and activating the second illuminator;
and a timer mechanism, said timer mechanism deactivating said first illuminator and said second illuminator after a passage of time ranging between 30 seconds and 10 minutes.

9. The illumination system of claim 8, wherein said first illuminator further comprises said receiver.

10. The illumination system of claim 9, further comprising a remote control having a light switch activator and a remote control transmitter, wherein said light switch activator sending a signal from said remote control transmitter to said receiver on said first illuminator and at least said second illuminator.

11. The illumination system of claim 8, wherein the first proximate detector is an infrared sensor.

12. The illumination system of claim 8, wherein the first proximate detector is a photocell.

13. The illumination system of claim 8, wherein said first transmitter transmits the signal within a frequency between 300 Mhz-500 Mhz.

14. The illumination system of claim 8, further comprising multiple illuminators.

15. The illumination system of claim 8, further comprising multiple proximate detectors.

16. An illumination system comprising:
a first illuminator having a first proximate detector;
a second illuminator, having a second proximate detector;
said first and said second illuminators each having a first transmitter, a receiver, and a power source; wherein
said first proximate detector detecting a passing of a human body and activating said first transmitter to send a signal to said receiver on said second illuminator; or
said second proximate detector detecting a passing of a human body and activating said first transmitter to send the signal to said receiver on said first illuminator;
and a timer mechanism, the timer mechanism disabling said first and said second illuminators upon passage of time between 30 seconds and 10 minutes.

17. The illumination system of claim 16, further comprising a remote control having a light switch actuator and a remote control transmitter, wherein said remote control transmitter sends a signal activating said first illuminator.

18. The illumination system of claim 16, wherein the first proximate detector or said second proximate detector is an infrared sensor.

19. The illumination system of claim 16, wherein the first proximate detector or said second proximate detector is a photocell.

20. A method of illuminating a contiguous illumination system comprising the steps of:
activating a proximate sensor by passing a transient object within a monitored zone;
transmitting an activation signal to all staircase illuminators within a contiguous illumination system;
illuminating all staircase illuminators within said contiguous illumination system;
using a timer to send a deactivation signal to all light fixtures within said contiguous illumination system;
disabling illumination of all staircase illuminators within said contiguous illumination system.

21. The method of illuminating a contiguous illumination system of claim 20, further comprising the step of sending a remote control activation signal to illuminate all staircase illuminators within said illumination system.

* * * * *